United States Patent
Ayadat

(10) Patent No.: US 11,661,710 B1
(45) Date of Patent: *May 30, 2023

(54) FROST HEAVE RESISTANT PAVEMENT STRUCTURE

(71) Applicant: Prince Mohammad Bin Fahd University, Dhahran (SA)

(72) Inventor: Tahar Ayadat, Dhahran (SA)

(73) Assignee: Prince Mohammad Bin Fahd University, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/974,634

(22) Filed: Oct. 27, 2022

Related U.S. Application Data

(63) Continuation of application No. 17/851,817, filed on Jun. 28, 2022, now Pat. No. 11,542,667.

(51) Int. Cl.
*E01C 3/06* (2006.01)
*B32B 27/32* (2006.01)
(Continued)

(52) U.S. Cl.
CPC ............... *E01C 3/06* (2013.01); *B32B 5/022* (2013.01); *B32B 5/18* (2013.01); *B32B 5/245* (2013.01); *B32B 11/046* (2013.01); *B32B 27/065* (2013.01); *B32B 27/32* (2013.01); *E01C 3/003* (2013.01); *B32B 2262/0253* (2013.01);
(Continued)

(58) Field of Classification Search
CPC ........... B32B 11/046; B32B 2262/0253; B32B 2266/025; B32B 2307/304; B32B 2307/416; B32B 2307/54; B32B 2307/581; B32B 2307/72; B32B 2307/7265; B32B 27/065; B32B 27/32; B32B 5/022;
(Continued)

(56) References Cited

FOREIGN PATENT DOCUMENTS

| | | |
|---|---|---|
| AT | 509 482 B1 | 9/2011 |
| CN | 203640124 U | 6/2014 |

(Continued)

OTHER PUBLICATIONS

Vaitkus, et al. ; Evaluation of Geotextiles Separation Performance on the Impact of Transport Loads: Experimental Research—Stage I ; The Baltic Journal of Road and Bridge Engineering, vol. II, No. 1 ; pp. 45-50 : 2007 : 6 Pages.

Segui, et al. ; Mechanical Behavior of Pavement Structures Containing Foam Glass Aggregates Insulation Layer: Laboratory and In Situ Study ; $18^{th}$ International Conference on Cold Regions Engineering and $8^{th}$ Canadian Permafrost Conference ; Abstract Only ; 1 Page.

(Continued)

*Primary Examiner* — Hai Vo
(74) *Attorney, Agent, or Firm* — Oblon, McClelland, Maier & Neustadt, L.L.P.

(57) ABSTRACT

A flexible pavement structure comprises a surface layer, a base layer, a sub-base layer, and a subgrade layer. Herein, the surface layer is adjacent to and above the base layer, and the sub-base layer is adjacent to and above the subgrade layer. The flexible pavement structure further comprises a layered system composed of first, second, and third materials different from each other, and is disposed as an interface layer between the base layer and the sub-base layer. The first material is a geotextile fabric selected from a group consisting of polypropylene and polyethylene, providing ground stabilization or reinforcement properties. The second material is a waterproof heat insulation material selected from a group consisting of cross-linked polyethylene foam and laminated aluminum foil, providing waterproofing or impermeability properties. The third material is a glass foamed insulation material.

15 Claims, 3 Drawing Sheets

(51) Int. Cl.
*B32B 27/06* (2006.01)
*E01C 3/00* (2006.01)
*B32B 5/02* (2006.01)
*B32B 11/04* (2006.01)
*B32B 5/18* (2006.01)
*B32B 5/24* (2006.01)
*E01C 7/26* (2006.01)

(52) U.S. Cl.
CPC ... *B32B 2266/025* (2013.01); *B32B 2307/304* (2013.01); *B32B 2307/416* (2013.01); *B32B 2307/54* (2013.01); *B32B 2307/581* (2013.01); *B32B 2307/72* (2013.01); *B32B 2307/7265* (2013.01); *E01C 7/26* (2013.01)

(58) Field of Classification Search
CPC . B32B 5/18; B32B 5/245; E01C 3/003; E01C 3/06; E01C 7/26
See application file for complete search history.

(56) References Cited

FOREIGN PATENT DOCUMENTS

| | | |
|---|---|---|
| CN | 208869899 U | 5/2019 |
| JP | 2000-178908 | 6/2000 |

OTHER PUBLICATIONS

Penner ; Experimental pavement structures insulated with a polyurethane and extruded polystyrene foam ; NRC Publications Archive ; Sep. 1968 ; 16 Pages.

Ballari, et al. ; Application of Geosynthetics for Strengthening of Flexible Pavement ; International Journal of Research, vol. 7, Issue XII ; Dec. 2018 ; 11 Pages.

Zhao, et al. ; Freeze and thaw field investigation of foamed asphalt cold recycling mixture in cold region ; Case Studies in Construction Materials, 15 ; Sep. 23, 2021 ; 13 Pages.

Dini, et al. ; Experimental investigation of vertical and horizontal reinforcement geotextiles in forest road pavement ; Journal of Forest Science, 64(7) ; pp. 296-302 ; 2018 ; 7 Pages.

FROST HEAVE RESISTANT PAVEMENT STRUCTURE

CROSS-REFERENCE TO RELATED APPLICATIONS

The present application is a Continuation of U.S. application Ser. No. 17/851,817, now allowed, having a filing date of Jun. 28, 2022.

BACKGROUND

Technical Field

The present disclosure is directed to pavement structures; and more particularly to a flexible pavement structure.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In many regions around the world seasonal temperature variations cause road network damage associated with differential heaving and bearing capacity losses during warmer seasons. It is known that soils, particularly those which contain more than 3 weight % of grains with a diameter of up to 0.02 mm, tend to frost heave at low temperatures. Specifically, the water between the grains freezes, and ice droplets formed during the freezing result in a reduced pressure in the adjacent capillaries, as unfrozen soil layers. The ice droplets rapidly grow in size which results in frost heaves and in the thawing period a softening of the soil occurs as a result of the accumulation of water in the capillaries.

Frost heaving and consequent thaw weakening, may cause damage to pavement structures, such as parking areas, roadways, airfields, etc. As a result, increased rutting and pothole formations are likely to occur, which ultimately results in the deterioration of the ride quality. This, in turn, leads to increased maintenance and higher rehabilitation costs. This problem is compounded by the infiltration of water into the pavement structure. The primary source of water in pavements is rain precipitation. This water can enter the pavement structure through several ways, including infiltration from shoulders and ditches.

In order to improve the durability of the pavement, thermal insulation is commonly used as a preventive measure to limit frost penetration in frost sensitive subgrade soil. However, the effectiveness of this type of pavement improvement is still inconclusive. Some alternative techniques have been employed to address the problem of deterioration of flexible pavement structures.

For example, US Patent Publication No. 20010002497A1 discloses a geocomposite system including a geocomposite layer having a geomembrane disposed between two geotextile backings, a structural layer for supporting the geocomposite layer, and a base layer formed on top of the geocomposite layer. This reference describes the use of a geomembrane that is impermeable and uses geotextile backings that are sufficiently porous to provide a wicking action of moisture or liquid laterally along the geomembrane and out of the geocomposite system to prevent moisture or liquid damage. This reference further provides that the geocomposite layer is bonded to and conforms to the structural layer.

Patent Publication No. JP2000178908A enables the utilization of waste glass and provides a road structure with an excellent frost heaving prevention effect by providing a foamed glass layer on a pavement layer. The reference discloses that the utilization of waste glass is enabled by providing a lower layer base course that is a foamed glass layer. This reference further provides that high frost heaving prevention can be obtained by insulating the lower layer base course, and further by burying a heating means on a pavement layer.

CN Utility Application No. 208869899U discloses a cement pavement repairing structure, which comprises a self-adhesive system on the cement road with an anti-cracking patch, a hot-melt layer, asphalt layer, a waterproof layer, a composite aluminium foil layer, and sunproof heat insulation layer. This reference discloses that the repairing structure is set on top part of sun-screening and heat insulation layers and a composite foil, heat-insulating and waterproof asphalt layer. The anti-cracking patch is set between a hot-melt layer and an asphalt layer.

Non-Patent Literature Document titled "Mechanical Behavior of Pavement Structures Containing Foam Glass Aggregates Insulation Layer: Laboratory and In Situ Study" presents a mechanical performance assessment of a foam glass aggregate layer based on three levels of experimentation, from the laboratory to in situ flexible pavement structures in cold regions conditions. This reference provides that the use of thermal insulation layers in flexible pavement structures increases the durability of the pavement and decreases the maintenance and rehabilitation costs.

Each of the aforementioned references suffers from one or more drawbacks hindering their adoption. None of the references combine water-proofing, thermal insulation, ground reinforcement, and erosion control layers, all of which are simultaneously needed for preventing damage to the pavement structures due to frost heaving. It is an object of the present disclosure to develop a new technique to concurrently improve the above listed properties while simultaneously improving impermeability and bearing capacity of the flexible pavement structures to limit frost penetration therein.

SUMMARY

In an exemplary embodiment, a flexible pavement structure is provided. The flexible pavement structure comprises a surface layer, which comprises asphaltic concrete. The flexible pavement structure further comprises a base layer. The surface layer is adjacent to and above the base layer. The flexible pavement structure further comprises a sub-base layer. The flexible pavement structure further comprises a subgrade layer. The sub-base layer is adjacent to and above the subgrade layer. A layered system, composed of first, second, and third materials which are different from each other, is disposed as an interface layer between the base layer and the sub-base layer. The first material is a geotextile fabric selected from a group consisting of polypropylene and polyethylene. The first material is present as a ground stabilizing or reinforcing layer in the layered system. The second material is a waterproof heat insulation material selected from a group consisting of cross-linked polyethylene (XPE) foam and laminated aluminum foil. The second material is present as a water proof or water impermeable layer in the layered system. The third material is a glass foamed insulation material.

In one or more exemplary embodiments, the first material has a tensile strength of from 10 kN/m to 20 kN/m. In one or more exemplary embodiments, the first material has a tensile elongation of from 50% to 65%. In one or more exemplary embodiments, the geotextile fabric has a CBR puncture resistance of from 2700 N to 2800 N. In one or more exemplary embodiments, the geotextile fabric has a cone drop of from 20 mm to 30 mm. In one or more exemplary embodiments, the first material has a pore size of from 50 μm to 250 μm. In one or more exemplary embodiments, the geotextile fabric has a permeability of from 50 $l/m^2$ to 65 $l/m^2$.

In one or more exemplary embodiments, the first material is adjacent to and above the second material in the flexible pavement structure.

In one or more exemplary embodiments, the second material has a thermal conductivity of from 0.01 W/mK to 0.1 W/mK. In one or more exemplary embodiments, the second material has a reflectivity of from 90% to 97%. In one or more exemplary embodiments, the second material has a temperature resistance of from 40° C. to 100° C. In one or more exemplary embodiments, the second material has a water vapor transmission rate of less than 1 g/m²/day. In one or more exemplary embodiments, the second material has a grams-per-square meter value of from 180 $g/m^2$ to 410 $g/m^2$. In one or more exemplary embodiments, the second material has a density of from 400 $g/m^2$ to 450 $g/m^2$.

In one or more exemplary embodiments, the second material is adjacent to and above the third material in the flexible pavement structure.

In one or more exemplary embodiments, the third material has a thermal conductivity of from 0.01 W/mK to 0.1 W/mK. In one or more exemplary embodiments, the third material has a compressive strength of from 300 kPa to 500 kPa.

In one or more exemplary embodiments, the first material further provides waterproofing properties. In one or more exemplary embodiments, the second material further provides thermal insulation properties. In one or more exemplary embodiments, the third material further provides both waterproofing and reinforcement properties.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
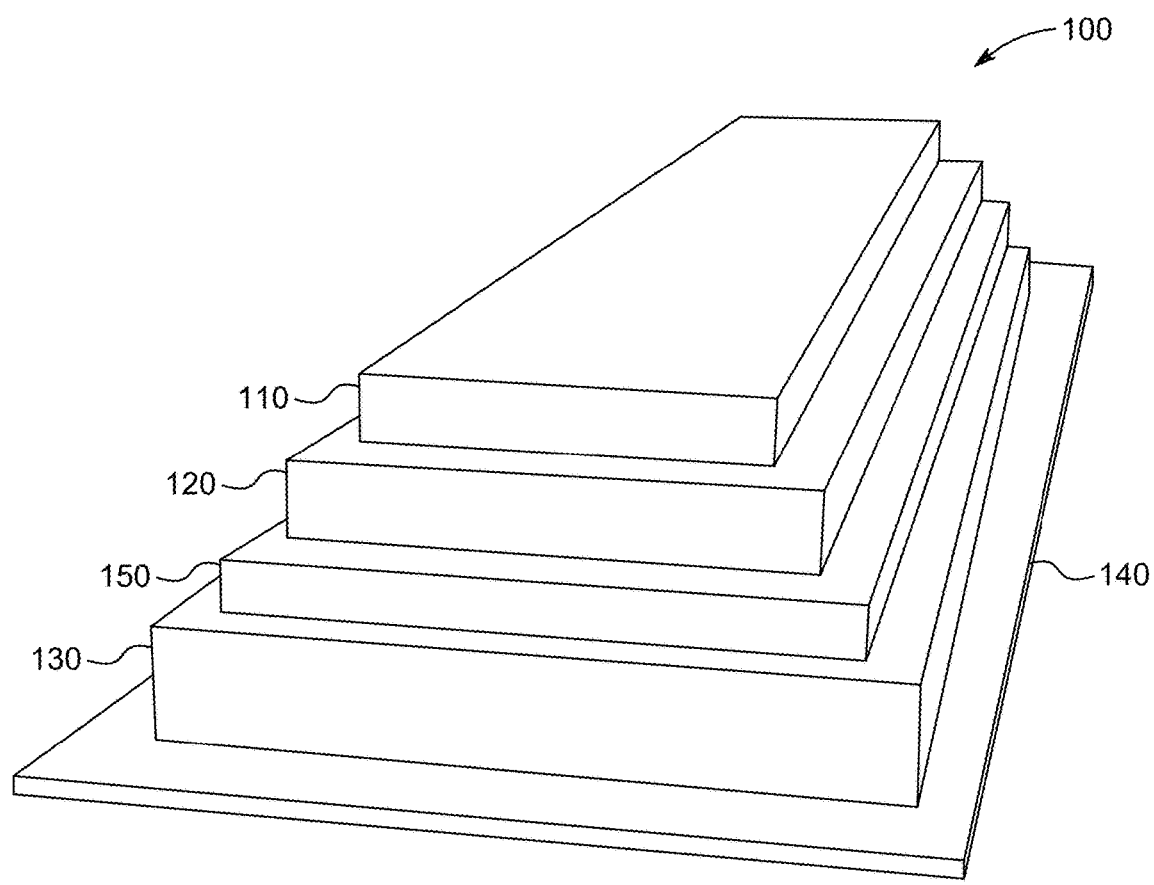
FIG. 1 is a diagrammatic perspective view illustration of a flexible pavement structure, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term, "base layer", refers to the layer immediately beneath the asphaltic concrete and provides additional load distribution and contributes to drainage. The base layer may include or comprise of any unbound aggregate, bitumen, binder, or cement-bound aggregate.

As used herein, the term, "sub-base layer", refers to a layer that functions primarily as structural support but it can also minimize the intrusion of fines into the subgrade and into the pavement structure which can improve drainage. The sub-base is made up of smaller aggregate/rocks of various sizes and particles often used to fill in space or gaps which can be compacted to form a more solid surface.

As used herein, the term, "subgrade layer", refers to stratum of sub-soil where minerals accumulate that has been compacted to withstand the loads above it. Sub-soil can refer to the stratum of weathered material that underlies the surface soil but above the hard rock of the Earth. It is also known as the "Formation Level", which can be defined as the level at which excavation ceases and construction starts.

As used herein, the term, "waterproof properties", refers to being mostly impervious to water especially being covered or treated with a material (such as a solution of rubber) to prevent permeation by water. A double-digit Ingress Protection mark, IP score, or a permeance to water vapor value can denote the extent of unwanted water intrusion and level of water protection for the user.

As used herein, the term, "thermal insulation properties", refers to a property of relatively low heat conductivity used to shield a volume against loss or entrance of heat by radiation, convection, or conduction, thereby making the volume mostly impervious to heat transfer, ranging of from 75-99% of the volume being shielded from heat transfer.

As used herein, the term, "reinforcement properties", refers to a property added to provide more strength or support, in terms of balance, center of gravity, or durability.

As used herein, the term. "geotextile", refers to fabrics which, when used in association with soil, have the ability to separate, filter, reinforce, protect, or drain. Geotextiles typically are made from polyolefins such as polyethylene and polypropylene or other polymer materials such as polyester, and geotextile fabrics come in three basic forms: woven, needle punched, or heat bonded. The geotextile can also comprise a polyolefin, polyester, or polyamide polymer.

As used herein, the term, "tensile strength", refers to the maximum load that a material can support without fracture when being elongated, stretched, or lengthened. Tensile strength is measured according to ASTM D638-14.

As used, herein, the term, "tensile elongation", refers to the stretching that a material undergoes as it is pulled in tension and is a measure of both elastic deformation and plastic deformation, and is commonly expressed as a percentage between 0% and 100%. Tensile elongation is also measured according to ASTM D638-14.

As used herein, the term, "California bearing ratio (CBR) puncture resistance", refers to the forcing of a 50-mm (2.0 in) diameter plunger through a horizontally fixed geosynthetic of 150 mm (6.0 in.) diameter, used in assessing soil strength for road subgrades, and is an axisymmetric strength test. CBR is measured according to ASTM D1883-21.

As used herein, the term, "cone drop", refers to the measurement of the diameter of a hole made by a metal cone dropped from a height onto a specimen of geotextile clamped in a circular block and suspended in fresh air. Cone drop is measured according to ASTM D7380-08.

As used herein, the term, "pore size", refers to the distance between two opposite walls or surfaces of the pore, such as the diameter of cylindrical pores or the width of slip-shaped pores.

As used herein, the term, "permeability", refers to the state or quality of a material or membrane that causes it to allow liquids or gases to pass through it.

As used herein, the term, "thermal conductivity", refers to the rate at which heat passes through a specified material, expressed as the amount of heat that flows per unit time through a unit area with a temperature gradient of one degree per unit distance (watts per meter-Kelvin).

Thermal conductivity is measured according to ASTM D7984-21 As used herein, the term, "reflectivity", refers to the property of reflecting light or radiation, especially reflectance as measured independently of the thickness of a material and is commonly expressed as a percentage between 0% and 100%. Reflectivity is measured according to ASTM F1252-21.

As used herein, the term, "temperature resistance" or "thermal resistance", refers to the ratio of the temperature difference between the two faces of a material to the rate of heat flow per unit area. Thermal resistance determines the heat insulation property of a textile material. The higher the thermal resistance, the lower is the heat loss.

As used herein, the term, "water vapor transmission rate", refers to the steady state rate at which water vapor permeates through a film at specified conditions of temperature and relative humidity. Water vapor transmission rate is measured according to ASTM F1249-20.

As used herein, the term, "grams-per-square meter", refers to the weight of the fabric if you take a sheet of material which is one meter by one meter square and weigh it in grams and is a benchmark specification to meet production manufacturing requirements.

As used herein, the term, "compressive strength", refers to the resistance of a material to breaking under compression. The compressive strength is measured according to ASTM D6571-22.

Aspects of the present disclosure are directed to a technique to improve simultaneously the impermeability, the thermal insulation, and the bearing capacity of flexible pavement structures. The technique includes forming a layered system composed of three different materials as part of a flexible pavement structure. These different materials are formed as thin layers which are placed or installed in an interface between a base layer and a sub-base layer of the flexible pavement structure. The three different materials include a geotextile fabric which helps with improving ground stabilization or reinforcement properties of the flexible pavement structure, a waterproof heat insulation material which helps with improving waterproofing or impermeability properties of the flexible pavement structure, and a glass foamed insulation material which helps with improving thermal insulation properties of the flexible pavement structure.

Referring to FIG. 1, illustrates a diagrammatic perspective view illustration of a flexible pavement structure (represented by reference numeral 100). The flexible pavement structure 100, as described herein, refers to a pavement structure which deflects, or flexes, under loading. The flexible pavement structure 100 includes multiple material layers each of which receives loads from the above layer, spreads the load out, then passes the load on to the layer underneath. As illustrated in FIG. 1, the flexible pavement structure 100 includes a surface layer 110, a base layer 120, a sub-base layer 130 and a subgrade layer 140. It may be understood that the further down in the flexible pavement structure 100 a particular layer is, the less load (in terms of force per area) that particular layer may be subject to. Thus, the said material layers are usually arranged within the flexible pavement structure 100 in order of descending load bearing capacity, with the highest load bearing capacity material being arranged at a top of the flexible pavement structure 100 and the lowest load bearing capacity material being arranged at a bottom of the flexible pavement structure 100.

The surface layer 110 (also known as surface course) is the top-most layer of the flexible pavement structure 100. Thus, the surface layer 110 has direct contact with the load placed directly on the flexible pavement structure 100, such as vehicular loads. The surface layer 110 includes asphaltic concrete, which is a mixture of asphalt cement and aggregate. The weight bearing capability quality of the surface layer 110 depends on the composition of the asphalt concrete used. In an example, the surface layer 110 is constructed using Hot Mix Asphalt (HMA), which is a combination of approximately 95% stone, sand, or gravel bound together by asphaltic cement. In particular, the HMA includes aggregate and asphalt cement mixed together at elevated temperatures that when cooled forms a hard, strong construction material. In some embodiments, the surface layer 110 is constructed from poured cement, stamped concrete, interlocking pavers, tar and chip, stone chips, or exposed aggregates. Generally, the surface layer 110 may have a thickness of about 50 to 500 mm, preferably from about 100 to 200 mm, preferably 110 mm to 190 mm, preferably 120 mm to 180 mm, preferably 130 mm to 170 mm, preferably 140 mm to 160 mm, or 150 mm. The surface layer 110 provides characteristics such as friction, smoothness, noise control, rut resistance and drainage to the flexible pavement structure 100. In particular, the function of the surface layer 110 is to withstand high tire pressure, resist wheel abrasion, provide skid resistance and to waterproof the flexible pavement structure 100. In some embodiments, the surface layer 110 has a filler or a fiber-stabilizer, such as fiberglass, to reinforce the surface layer 110. In some embodiments, the aggregates have a density of from 50 pounds per cubic foot (pcf) to 1000 pcf, preferably 100 pcf to 900 pcf, preferably 200 pcf to 800 pcf, preferably 300 pcf to 700 pcf, preferably 400 pcf to 600 pcf, or 500 pcf. In some embodiments, the aggregates have a particle size distribution of from 10 millimeters (mm) to 200 mm, preferably 30 mm to 180 mm, preferably 50 mm to 160 mm, preferably 70 mm to 140 mm, preferably 90 mm to 120 mm, or 100 mm.

In some examples, the surface layer 110 may further be subdivided into two layers, a wearing course (not shown) and a binder course (not shown), with the wearing course being arranged at the top of the binder course. Since the wearing course is required to be directly in contact with loads (traffic), good quality aggregates and high dense bitumen or asphalt is used for construction thereof. Generally, the wearing course may have a thickness of about 25 to 50 mm, preferably 27.5 mm to 47.5 mm, preferably 30 mm to 45 mm, preferably 32.5 mm to 42.5 mm, preferably 35 mm to 40 mm, or 37.5 mm. The wearing course is also made water-tight against surface water infiltration. In some embodiments, the wearing course includes an epoxy, a resin, a polymer, or the like to form a water-tight boundary. Thereby, the wearing course prevents entrance of surface water into the base layer 120, the sub-base layer 130 and the subgrade layer 140, as arranged underneath the surface layer 110 in the flexible pavement structure 100. The binder course is also constructed using aggregates and bitumen but may be of relatively less quality than materials used for the wearing course to save cost as it is not directly in contact with loads. In general, the binder course may have a thickness of about 50 to 100 mm, preferably 55 mm to 95 mm, preferably 60 mm to 90 mm, preferably 65 mm to 85 mm, preferably 70 mm to 80 mm, or 75 mm. The function of the binder course is to transfer the loads coming from the wearing course to the base layer 120. In another example, if economics may not be a concern, the wearing course and the binder course may be constructed monotonically using good quality materials with about 100 to 200 mm thickness, to form the surface layer 110, preferably 110 mm to 190 mm, preferably 120 mm to 180 mm, preferably 130 mm to 170 mm, preferably 140 mm to 160 mm, or 150 mm.

The base layer 120 is arranged such that the surface layer 110 is adjacent to and above the base layer 120, in the flexible pavement structure 100. The base layer 120 is constructed with hard and durable aggregates which may be either stabilized or granular or both. In particular, the base layer 120 includes granular materials such as crushed stone, crushed or uncrushed gravel, rock, slags, and sand. In some embodiments, the granular materials have a density of from 50 pounds per cubic foot (pcf) to 1000 pcf, preferably 100 pcf to 900 pcf, preferably 200 pcf to 800 pcf, preferably 300 pcf to 700 pcf, preferably 400 pcf to 600 pcf, or 500 pcf. In some embodiments, the granular materials have a particle size distribution of from 10 millimeters (mm) to 200 mm, preferably 30 mm to 180 mm, preferably 50 mm to 160 mm, preferably 70 mm to 140 mm, preferably 90 mm to 120 mm, or 100 mm.

The materials used in the base layer 120 may generally have better properties than those used for the sub-base layer 130 in terms of gradation and strength. A thickness of the base layer 120 may be defined such that the base layer 120 helps to reduce the load capacity on the sub-base layer 130 and the subgrade layer 140. Generally, the base layer 120 may have the thickness of from 100 mm to 300 mm, preferably 110 mm to 290 mm, preferably 120 mm to 280 mm, preferably 130 mm to 270 mm, preferably 140 mm to 260 mm, preferably 150 mm to 250 mm, preferably 160 mm to 240 mm, preferably 170 mm to 230 mm, preferably 180 mm to 220 mm, preferably 190 mm to 210 mm, or 200 mm. The base layer 120 helps to provides structural support for the flexible pavement structure 100. In particular, the base layer 120 helps to distribute the loads from the surface layer 110 to the sub-base layer 130 and the subgrade layer 140, as arranged underneath thereof in the flexible pavement structure 100. In some configurations, the base layer 120 may be stabilized with Portland cement, asphalt or lime to improve its material loading properties. In some embodiments, the base layer with Portland cement may be further reinforced with fly ash, silica fume, pumice, slag, shale, or clay. Further, in some configurations the base layer 120 may be provided with a sub-surface drainage system of the flexible pavement structure 100.

The sub-base layer 130 is provided below the base layer 120. The sub-base layer 130 may be constructed out of crushed (granular) aggregate, or a mixture of fine and coarse aggregate, or engineered fill. In some embodiments, the aggregates have a density of from 50 pounds per cubic foot (pcf) to 1000 pcf, preferably 100 pcf to 900 pcf, preferably 200 pcf to 800 pcf, preferably 300 pcf to 700 pcf, preferably 400 pcf to 600 pcf, or 500 pcf. In some embodiments, the aggregates have a particle size distribution of from 10 millimeters (mm) to 200 mm, preferably 30 mm to 180 mm, preferably 50 mm to 160 mm, preferably 70 mm to 140 mm, preferably 90 mm to 120 mm, or 100 mm. Generally, the sub-base layer 130 may be constructed of lower quality materials than the base layer 120 but superior to the materials in the sub-grade layer 140 in terms of bearing capacity, for better economics. In some configurations, the sub-base layer 130 may not always be needed or used. For example, if soil in the subgrade layer 140 is strong and stiff, then there may be no need to construct the sub-base layer 130 in the flexible pavement structure 100. However, if the subgrade layer 140 is weak, then the sub-base layer 130 is provided with a minimum thickness of about 100 mm. The sub-base layer 130 may generally have the same functions as the base layer 120. The sub-base layer 130 functions primarily as structural support. The sub-base layer 130 may also minimize the intrusion of fines from the subgrade layer 140 into the flexible pavement structure 100. In some examples, the sub-base layer 130 may also help with improving drainage in the flexible pavement structure 100.

The subgrade layer 140 is preferably the bottom-most layer of the flexible pavement structure 100. Herein, the sub-base layer 130 is arranged adjacent to and above the subgrade layer 140. The subgrade layer 140 includes natural materials, such as soil, rocks, or the like, located along horizontal alignment of the flexible pavement structure 100, and serves as a foundation for the flexible pavement structure 100. Specifically, the subgrade layer 140 includes natural soil (sub-grade) compacted up to required depth, generally about 150 to 300 mm, preferably 160 to 290 mm, preferably 170 to 280 mm, preferably 180 to 270 mm, preferably 190 to 260 mm, preferably 200 to 250 mm, preferably 210 to 240 mm, preferably 220 to 230 mm, or 225 mm. The subgrade layer 140 may also include borrow materials, which may also be well compacted. In some embodiments, the borrow materials have a density of from 50 pounds per cubic foot (pcf) to 1000 pcf, preferably 100 pcf to 900 pcf, preferably 200 pcf to 800 pcf, preferably 300 pcf to 700 pcf, preferably 400 pcf to 600 pcf, or 500 pcf. In some embodiments, the borrow materials have a particle size distribution of from 10 millimeters (mm) to 200 mm, preferably 30 mm to 180 mm, preferably 50 mm to 160 mm, preferably 70 mm to 140 mm, preferably 90 mm to 120 mm, or 100 mm. In an example, an upper region of about 150-200 mm thickness of the subgrade layer 140 is scarified and blended to provide a uniform material before it is compacted to maximum density, preferably 155-195 mm, preferably 160-190 mm, preferably 165-185 mm, preferably 170-180 mm, or 175 mm. The subgrade layer 140 receives the loads coming from the layers above thereof, including the surface layer 110, the base layer 120 and the sub-base layer 130. Therefore, it is important to keep the stresses coming from the said above layers to be within the limit of sub-grade capacity. In some configurations, the materials of the subgrade layer 140 may be treated with certain types of stabilizers to achieve required strength properties for the purpose of increasing the sub-grade capacity. Further, in some configurations, in order to reduce the amount of stress on the subgrade layer 140, sometimes thicknesses of the surface layer 110, the base layer 120 and the sub-base layer 130 may be increased to compensate for lower sub-grade capacity of the subgrade layer 140.

In some configurations, the flexible pavement structure 100 may also be provided with additional layers to improve its characteristics. For instance, the flexible pavement structure 100 may include a seal coat (not shown) applied directly on top of the surface layer 110 to make it watertight and to provide skid resistance to the flexible pavement structure 100. In an example, the seal coat may use a material including a mixture of emulsified asphalt, mineral fillers and water. The flexible pavement structure 100 may also include a tack coat (not shown) applied on top of the binder course to develop strong bond between the binder course and surface course in the surface layer 110. In an example, the tack coat may use a material including an asphalt emulsion diluted with water. The flexible pavement structure 100 may also include a prime coat (not shown) applied between the surface layer 110 and the base layer 120 to develop strong and water-tight bond therebetween. In an example, the prime coat may use a material including a low viscous cutback bitumen sprayed on top of base layer 120 as the prime coat.

According to embodiments of the present disclosure, as illustrated in FIG. 1, the flexible pavement structure 100 further includes a layered system (represented by reference numeral 150). As shown, the layered system 150 is disposed as an interface layer between the base layer 120 and the sub-base layer 130 of the flexible pavement structure 100. In other words, the layered system 150 is arranged between the base layer 120 and the sub-base layer 130 in the flexible pavement structure 100. The layered system 150 is provided as frost protection layer for the flexible pavement structure 100 for its implementation in colder regions. One function of the layered system 150 is to prevent damage of the flexible pavement structure 100 from frost heaves, which are formed by freezing of groundwater. The layered system 150 limits frost penetration in frost susceptible subgrade soils, significantly reducing road network damage associated with differential heaving and bearing capacity loss during seasonal temperature variations, restricts water infiltration, and thereby reduces the associated damage and the rehabilitation costs considerably.

Figure 2:
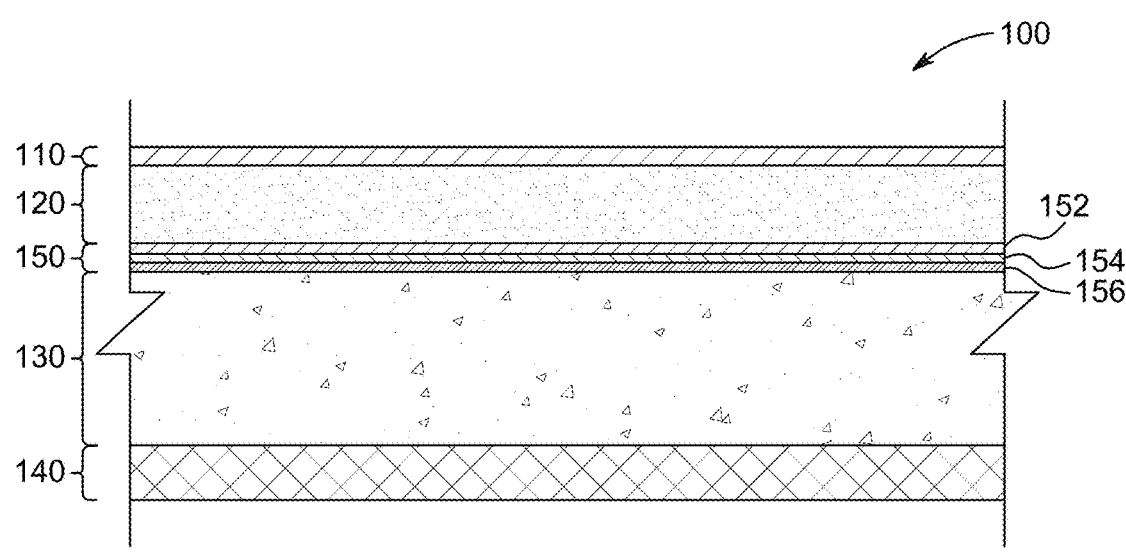
FIG. 2 is a diagrammatic cross-section illustration of the flexible pavement structure of FIG. 1, according to certain embodiments.
Figure 3:
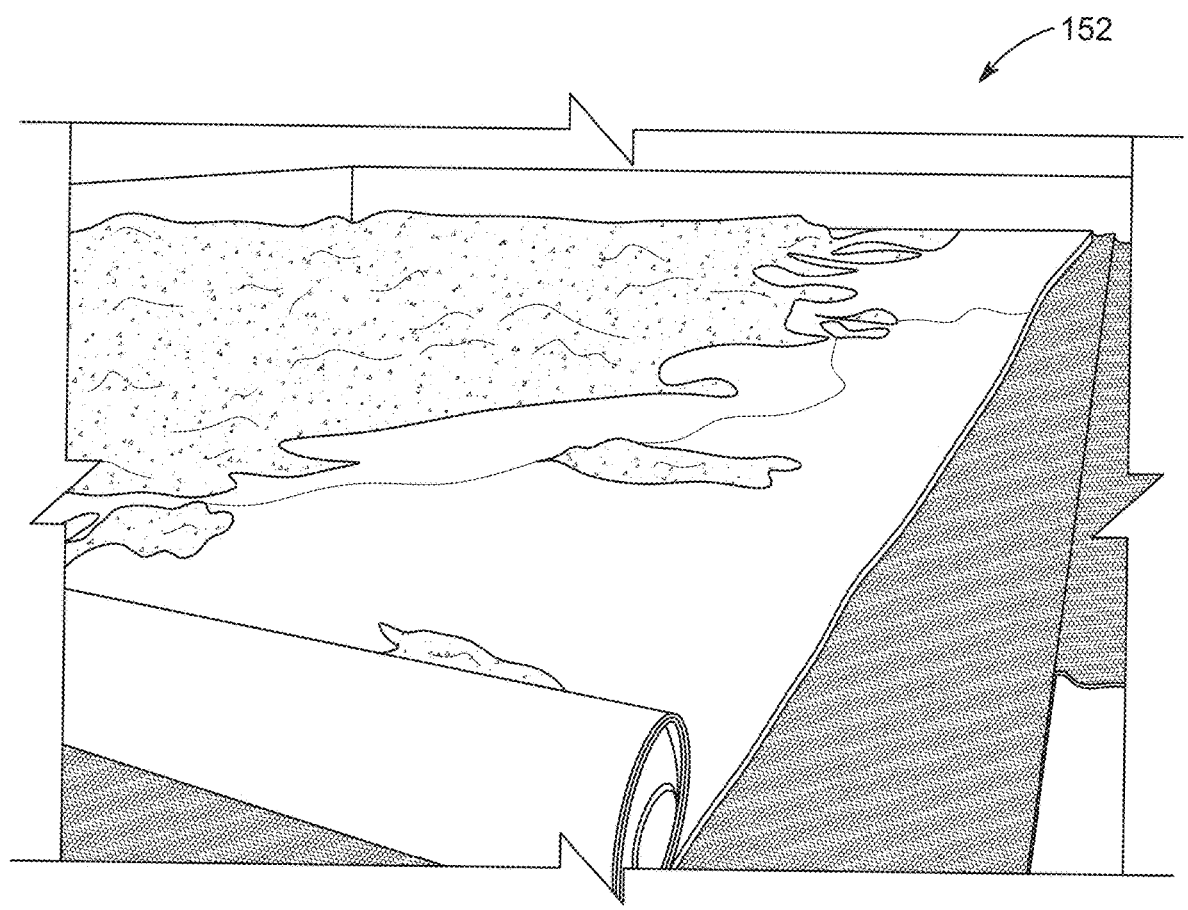
FIG. 3 is a pictorial depiction of a first material of the flexible pavement structure, according to certain embodiments.
Figure 4:
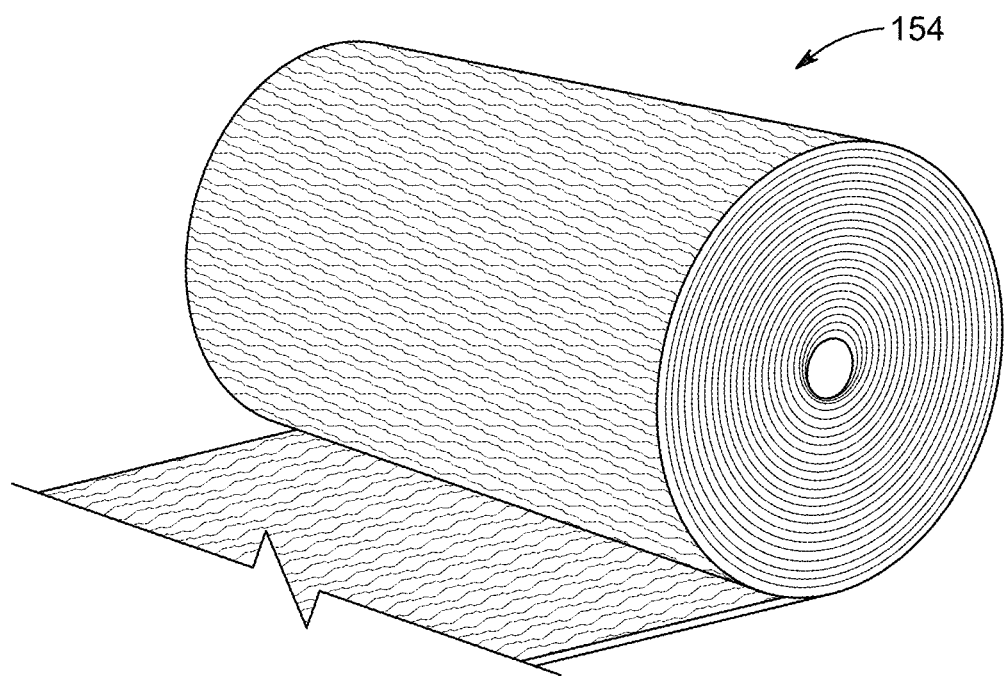
FIG. 4 is a diagrammatic representation of a second material of the flexible pavement structure, according to certain embodiments.
Figure 5:
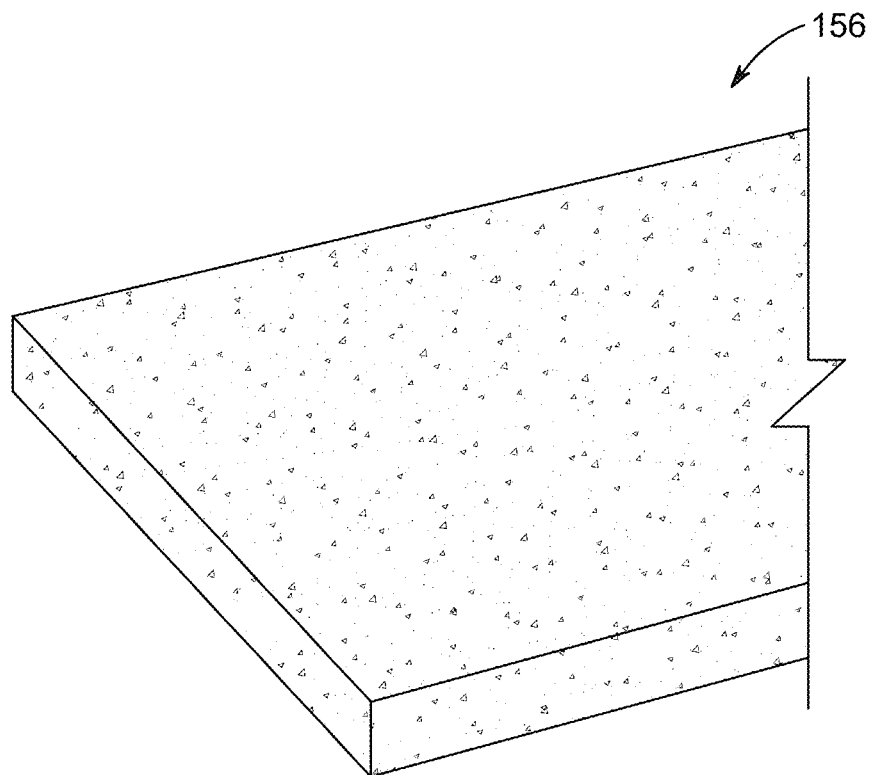
FIG. 5 is a diagrammatic representation of a third material of the flexible pavement structure, according to certain embodiments.

FIG. 2 illustrates a cross-section view of the flexible pavement structure 100 showing details of the layered system 150 therein. As illustrated, in the present embodiments, the layered system 150 is composed of first, second, and third materials different from each other. That is, the layered system 150 includes three layers of different materials, including a first layer of the first material (represented by reference numeral 152), a second layer of the second material (represented by reference numeral 154), and a third layer of the third material (represented by reference numeral 156). Hereinafter, any reference to the first material 152 shall be construed as reference to the said first layer of the first material 152, any reference to the second material 154 shall be construed as reference to the said second layer of the second material 154, and any reference to the third material 156 shall be construed as reference to the said third layer of the third material 156, respectively, without any limitations. As shown in FIG. 2, the first material 152 is adjacent to and above the second material 154 in the flexible pavement structure 100. Further, the second material 154 is adjacent to and above the third material 156 in the flexible pavement structure 100. That is, the first material 152 is the top-most layer in the layered system 150, the second material 154 is disposed as a layer between the first material 152 and the third material 156 in the layered system 150, and the third material 156 is the bottom-most layer in the layered system 150.

The first material 152 is configured to provide the flexible pavement structure 100 with ground stabilization or reinforcement properties. The first material 152 further provides waterproofing properties to the flexible pavement structure 100. In the present embodiments, the first material 152 is a geotextile fabric selected from a group consisting of a polyolefin such as polypropylene and polyethylene, a polyester and/or a polyamide. The geotextile fabric may be a lightweight, thermally bonded, non-woven, permeable material designed for use in ground stabilization, drainage, reinforcement, and erosion control. In an example, the geotextile fabric used as the first material is Terram 2000 (Terram). Terrain is made from 67% polypropylene and 33% polyethylene. In some embodiments, the geotextile fabric may contain polypropylene in a range from 50% to 70%, preferably 51% to 69%, preferably 52% to 68%, preferably 53% to 67%, preferably 54% to 66%, preferably 55% to 65%, preferably 56% to 64%, preferably 57% to 63%, preferably 58% to 62%, preferably 59% to 61%, or 60%. In some embodiments, the geotextile fabric may contain polyethylene in a range from 30% to 50%, preferably 31% to 49%, preferably 32% to 48%, preferably 33% to 47%, preferably 34% to 46%, preferably 35% to 45%, preferably 36% to 44%, preferably 37% to 43%, preferably 38% to 42%, preferably 39% to 41%, or 40%. In some embodiments, no more than 0.55 kilograms (kg) of water per square meter should escape from the first material 152 in 72 hours, preferably no more than 0.525 kg, preferably no more than 0.5 kg, preferably no more than 0.475 kg, preferably no more than 0.45 kg, preferably no more than 0.425 kg, preferably no more than 0.4 kg, preferably no more than 0.375 kg, preferably no more than 0.35 kg, preferably no more than 0.325 kg, or no more than 0.3 kg. The use of geotextile fabric, as the first material 152, enhances the performance and design life of the flexible pavement structure 100 by providing the reinforcement, filtration and separation functions.

In an embodiment, the first material 152 has a tensile strength of from 10 kN/m to 20 kN/m. For instance, Terram as the first material 152 has the tensile strength of about 14.5 kN/m. Further, in an embodiment, the first material has a tensile elongation of from 50% to 65%, preferably 51% to 64%, preferably 52% to 63%, preferably 53% to 62%, preferably 54% to 61%, preferably 55% to 60%, preferably 56% to 59%, preferably 57% to 58%, or 57.5%. For instance, Terram as the first material 152 has the tensile elongation of about 60%. Such high tensile strength value and high tensile elongation value of the first material 152 makes it suitable for use in the flexible pavement structure 100 where high strength and tearing resistance is required.

In an embodiment, the geotextile fabric has a California Bearing Ratio (CBR) puncture resistance of from 2700 N to 2800 N, preferably 2710 N to 2790 N, preferably 2720 N to 2780 N, preferably 2730 N to 2770 N, preferably 2740 N to 2760 N, or 2750 N. It may be noted that the CBR puncture resistance is a standard test designed to provide a value (in N) indicative of a relative ability of geosynthetics to resist objects or stones from bursting or pushing through the material. For instance, Terram as the geotextile material has a CBR puncture resistance of about 2750 N. Further, in an embodiment, the geotextile fabric has a cone drop of from 20 mm to 30 mm, preferably 21 mm to 29 mm, preferably 22 mm to 28 mm, preferably 23 mm to 27 mm, preferably 24 mm to 26 mm, or 25 mm. It may be noted that the cone drop is a standard test designed to provide a value (in mm) indicative of a resistance of geosynthetics to penetration by a steel cone dropped from a fixed height. For instance, Terram as the geotextile fabric has a cone drop of about 26 mm. Such high CBR puncture resistance value and high cone drop value provide the first material 152 with the relative ability to resist objects or stones from bursting or penetrating through the material, and thereby resist construction damage during installation and placing of fill material, such as with compacting equipment, for the flexible pavement structure 100.

In an embodiment, the first material 152 has a pore size of from 50 μm to 250 μm preferably 75 μm to 225 μm, preferably 100 μm to 200 μm, preferably 125 μm to 175 μm, or 150 μm. As used herein, the pore size is a measurement of the gaps between the fibers within a permeable material such as a geotextile fabric. For instance, Terrain as the first material 152 has the pore size (mean) of about 65 μm. Further, in an embodiment, the geotextile fabric has a permeability of from 50 $l/m^2s$ to 65 $l/m^2s$, 52.5 $l/m^2s$ to 72.5 $l/m^2s$, preferably 55 $l/m^2s$ to 70 $l/m^2s$, preferably 57.5 $l/m^2s$ to 67.5 $l/m^2s$, preferably 60 $l/m^2s$ to 65 $l/m^2s$, or 62.5 $l/m^2s$. For instance, Terram as the geotextile fabric has a permeability of about 55 $l/m^2s$. Such low pore size value and high permeability value of the geotextile fabric allows to filter different soils from course silt to large gravel whilst allowing the passage of water.

In a particularly preferred embodiment of the invention, the first layer (152) of the layered system (150) includes a plurality of layers of different width. A top layer of substantially narrower width than a bottom layer is present on the top of the bottom layer. The top layer is preferably a continuous layer of a polyolefin material that comprises a fluorescent dye in an amount of 0.5-20% by weight, preferably 1-10% or 2-5% by weight of the top layer. This layer is provided in two continuous lengths running longitudinally with the other layers of the structure 100. The top layer preferably has a width of from 0.25-1 m, preferably 0.5-0.75 m. A first continuous top layer is provided at a location in the roadbed generally corresponding with tire wear in a first lane of traffic and a second continuous top layer is positioned parallel to the first layer generally corresponding with a tire wear patterns of an opposing two-axle vehicles. Preferably the top and bottom layers of 152 are integrated to form a seamless layer 152. An important benefit of the fluorescent dye-containing top layer of 152 functions to provide a safety check or inspection of the road bed to identify track peeling or road base loss leading to exposure of sub-layers of the road structure.

Further, the second material 154 is configured to provide the flexible pavement structure 100 with waterproofing or impermeability properties. The second material 154 further provides thermal insulation properties to the flexible pavement structure 100. In the present embodiments, the second material 154 is a waterproof heat insulation material selected from a group consisting of cross-linked polyethylene (XPE) foam and laminated Aluminum (Alu) foil. In an example, the waterproof heat insulation material may have double-sided Alu foil laminated on the XPE foam. In some embodiments, the Alu foil layer has a thickness of 10 mm to 100 mm on the XPE foam, preferably 20 mm to 90 mm, preferably 30 mm to 80 mm, preferably 40 mm to 70 mm, preferably 50 mm to 60 mm, or 55 mm. In some embodiments, the XPE foam may be cross-linked with polyvinyl alcohol, poly (lactic-co-glycolic acid), poly(lactic-co-glycol), polylactic acid, polycaprolactone, polyglycolic acid, polybutylene terephthalate, or polyethylene terephthalate. In some embodiments, the second material 154 has a permeance to water vapor range of 15 $g\text{-}cm\text{-}m^{-2}\text{-}day^{-1}\text{-}mmHg^{-1}$ to 35 $g\text{-}cm\text{-}m^{-2}\text{-}day^{-1}\text{-}mmHg^{-1}$, preferably 17.5 $g\text{-}cm\text{-}m^{-2}\text{-}day^{-1}\text{-}mmHg^{-1}$ to 32.5 $g\text{-}cm\text{-}m^{-2}\text{-}day^{-1}\text{-}mmHg^{-1}$, preferably 20 $g\text{-}cm\text{-}m^{-2}\text{-}day^{-1}\text{-}mmHg^{-1}$ to 30 $g\text{-}cm\text{-}m^{-2}\text{-}day^{-1}\text{-}mmHg^{-1}$, preferably 22.5 $g\text{-}cm\text{-}m^{-2}\text{-}day^{-1}\text{-}mmHg^{-1}$ to 27.5 $g\text{-}cm\text{-}m^{-2}\text{-}day^{-1}\text{-}mmHg^{-1}$, or 25 $g\text{-}cm\text{-}m^2\text{-}day\text{-}mmHg^{-1}$. The permeance to water vapor can be defined as the quantity of vapor flow across a unit area that will flow through a unit thickness under a unit vapor pressure difference. In some alternate embodiments, the second material 154 may use Expanded Polyethylene Foam (EPE) foam instead of XPE foam without departing from spirit and scope of the present disclosure. The XPE/EPE foam laminated Alu foil provides low thermal conductivity and excellent heat insulation. The XPE/EPE foam laminated Ahi foil further has high tearing strength, and is protective, versatile, and environmentally friendly. Such use of XPE/EPE foam laminated Alu foil as the second material 154 helps with resisting heat transfer from conduction, convection, and radiation, and provides an effective barrier against moisture, air currents and vapors for the flexible pavement structure 100. In particular, the side of the XPE/EPE foam laminated Alu foil forms an effective water-proof, moisture-proof, anti-static, anti-pull, leak-resistant, and fire-resistant layer for the flexible pavement structure 100.

In an embodiment, the second material 154 has a thermal conductivity of from 0.01 W/mK to 0.1 W/mK (Watts per meter-Kelvin), preferably 0.02 W/mK to 0.09 W/mK, preferably 0.03 W/mK to 0.08 W/mK, preferably 0.04 W/mK to 0.07 W/mK, preferably 0.05 W/mK to 0.06 W/mK, or 0.055 W/mK. For instance, the XPE foam laminated Alu foil has a thermal conductivity of about 0.03 W/mK. Further, in an embodiment, the second material 154 has a reflectivity of from 90% to 97%, preferably 90.5% to 96.5%, preferably 91% to 96%, preferably 91.5% to 95.5%, preferably 92% to 95%, preferably 92.5% to 94.5%, preferably 93% to 94%, or 93.5%. For instance, the XPE foam laminated Alu foil has a reflectivity of about 95% to 97%, preferably 95.2% to 96.8%, preferably 95.4% to 96.6%, preferably 95.6% to 96.4%, preferably 95.8% to 96.2%, or 96%. Such low thermal conductivity value and high reflectivity value of the second material 154 enables the flexible pavement structure 100 to resist heat transfer from conduction, convection, and radiation, as required for its applications in road construction.

In an embodiment, the second material 154 has a temperature resistance of from 40° C. to 100° C., preferably −30° C. to 90° C., preferably −20° C. to 80° C., preferably −10° C. to 70° C., preferably 0° C. to 60° C., preferably 10° C. to 50° C., preferably 20° C. to 40° C., or 30° C. The temperature resistance is a heat property of a material and a measurement of a temperature difference by which a material resists a heat flow and is calculated as a reciprocal of thermal conductance. Furthermore, in an embodiment, the second material 154 has a water vapor transmission rate of less than 1 g/m²/day, preferably less than 0.9 g/m²/day, preferably less than 0.8 g/m²/day preferably less than 0.7 g/m²/day preferably less than 0.6 g/m²/day preferably less than 0.5 g/m²/day preferably less than 0.4 g/m²/day preferably less than 0.3 g/m²/day preferably less than 0.2 g/m²/day, or less than 0.1 g/m²/day. Such a wide range of the temperature resistance and low WVTR value of the second material 154 provides the flexible pavement structure 100 with excellent thermal insulation properties, and with impermeability properties.

In an embodiment, the second material 154 has a grams-per-square meter (GSM) value of from 180 g/m² to 410 g/m². Further, in an embodiment, the second material 154 has a density of from 400 g/m² to 450 g/m². As used herein, the density is a measure of mass per unit area of a material, especially sheet-shaped material, and is expressed in terms of grams per square meter (g/m²), also commonly referred to as "grammage" in various industries. For instance, the XPE foam laminated Alu foil has the density of about 431 g/m². Such low GSM value and low density value of the second material 154 allows the flexible pavement structure 100 to achieve the said requisite properties of heat resistance and impermeability with a relatively thin layer of the second material 154.

Furthermore, the third material 156 is configured to provide the flexible pavement structure 100 with thermal insulation properties. The third material 156 further provides both waterproofing and reinforcement properties to the flexible pavement structure 100. In the present embodiments, the third material 156 is a glass foamed insulation material. In an example, the glass foamed insulation material is Foamglas® T3+ Slab XL, as known in the art. The glass foamed insulation material is a porous glass foam material. The third material 156 has advantages as a civil engineering material including its light weight, high strength, and thermal and acoustic insulating properties. In some embodiments, the glass foam material has a porosity of at least 0.25 porosity units, preferably at least 0.3 porosity units, preferably at least 0.35 porosity units, preferably at least 0.4 porosity units, preferably at least 0.45 porosity units, preferably at least 0.5 porosity units, preferably at least 0.55 porosity units, preferably at least 0.6 porosity units, preferably at least 0.65 porosity units, or 0.7 porosity units. Porosity can be expressed as a percentage the relationship of the volume of open pores in the test specimen to its exterior volume. Porosity units is the fraction of volume of voids over the total volume ranging from 0 to 1. In some embodiments, the third material 156 has a pore size distribution ranging from 1 µm to 50 µm, preferably 5 µm to 45 µm, preferably 10 µm to 40 µm, preferably 15 µm to 35 µm, preferably 20 µm to 30 µm, or 25 µm. The pore size can be defined as the mean size of the material's pores, or voids. The glass foamed insulation material is further moisture-proof, fireproof, and anti-corrosive, which provides advantages of long-term use performance. Further, the glass foamed insulation material has a truly hermetically sealed and closed cell vapor tight internal structure. The glass foamed insulation material also has the capability to withstand high compressive loads and to provide a permanent thermal performance. In some embodiments, the third material 156 can withstand loads ranging from 2000 pounds per square inch (psi) to 6000 psi, preferably 2250 psi to 5750 psi, preferably 2500 psi to 5500 psi, preferably 2750 psi to 5250 psi, preferably 3000 psi to 5000 psi, preferably 3250 psi to 4750 psi, preferably 3500 psi to 4500 psi, preferably 3750 psi to 4250 psi, or 4000 psi. The glass foamed insulation material further supports high compressive loads without deflection or movement. Furthermore, the closed cell structure of the glass foamed insulation material also prevents water penetration or tracking by capillary action. The close cell structure can be described as made of uniform cells that maintain their own shape, the cells having their own cell walls, thereby being more rigid and trap a large amount of air. Closed cell structures generally have higher densities, lower absorbencies, lower sound dampening, and higher compressive strengths in their application than open cell structures. In general, such use of the glass foamed insulation material as the third material 156 may provide an ideal insulation solution for load bearing areas, for the flexible pavement structure 100.

In an embodiment, the third material 156 has an operating temperature of about −200° C. to 430° C., preferably −200° C. to 400° C., preferably −150° C. to 350° C., preferably −100° C. to 300° C., preferably −50° C. to 350° C., preferably 0° C. to 300° C., preferably 50° C. to 250° C., preferably 100° C. to 200° C., or 150° C. Herein, the operating temperature is indicative of an allowable temperature range of the local ambient environment at which a material can operate. In an embodiment, the third material 156 has an expansion coefficient from $1\times10^{-5}$ per ° C. to $1\times10^{6}$ per ° C., preferably $1\times10^{-6}$ per ° C. to $9\times10^{-6}$ per ° C., preferably $2\times10^{-6}$ per ° C. to $8\times10^{-6}$ per ° C., preferably $3\times10^{-6}$ per ° C. to $7\times10^{-6}$ per ° C., preferably $4\times10^{-6}$ per ° C. to $6\times10^{-6}$ per ° C., or $5\times10^{-5}$ per ° C. Further, the third material 156 has an expansion coefficient of about $8\times10^{-6}$ per ° C. Herein, the expansion coefficient is indicative of the extent to which a material may expand or shrink with heat. Further, in an embodiment, the third material 156 has a thermal conductivity of from 0.01 W/mK to 0.1 W/mK, preferably 0.02 W/mK to 0.09 W/mK, preferably 0.03 W/mK to 0.08 W/mK, preferably 0.04 W/mK to 0.07 W/mK, preferably 0.05 W/mK to 0.6 W/mK, or 0.055 W/mK. As previously discussed, the thermal conductivity is a measure of the rate at which heat is transferred by conduction through a unit cross-section area of a material, when a temperature gradient exits perpendicular to the area. For instance, the glass foamed insulation material has the thermal conductivity of about 0.036 W/mK. Further, in an embodiment, the third material 156 has a compressive strength of from 300 kPa to 500 kPa, preferably 310 kPa to 490 kPa, preferably 320 kPa to 498 kPa, preferably 330 kPa to 497 kPa, preferably 340 kPa to 460 kPa, preferably 350 kPa to 450 kPa, preferably 360 kPa to 440 kPa, preferably 370 kPa to 430 kPa, preferably 380 kPa to 420 kPa, preferably 390 kPa to 410 kPa, or 400 kPa. Herein, the compressive strength (or compression strength) is a measure of capacity of a material to withstand loads tending to reduce size (as opposed to tensile strength which withstands loads tending to elongate). For instance, the glass foamed insulation material has the compressive strength of more than 500 kPa. The above listed characteristics of the third material 156 provides both waterproofing and reinforcement properties to the flexible pavement structure 100.

The present disclosure provides a technique to improve simultaneously the impermeability, the thermal insulation, and the bearing capacity of flexible pavement structures, such as the flexible pavement structure 100. The present disclosure describes introduction of the layered system 150 in the flexible pavement structure 100, which includes three layers of different materials placed or installed at an interface between the base layer 120 and the sub-base layer 130 of the flexible pavement structure 100. In various embodiments the layered system 150 composed of three different materials, provides ground stabilization or reinforcement properties because of the use of the geotextile fabric material, the waterproofing or impermeability properties because of the use of the XPE foam laminated Alu foil material, and thermal insulation properties because of the use of the glass foamed insulation material therein.

The combination of the multi-function of the layered system 150 enhances the performance of the flexible pavement structure 100. In particular, the combination of the multiple functions of the different materials 152, 154, 156 in the layered system 150 limit frost penetration in the frost susceptible subgrade soil, significantly reduce road network damages associated with differential heaving and bearing capacity loss during seasonal temperature variations, restrict water infiltration, and thus considerably reduce the associated damage and the rehabilitation costs for the flexible pavement structure 100. In alternate embodiments, the order in which materials 152, 154, and 156 are present in the layered system 150 may be altered or changed. Thereby, the layered system 150 provides a superior protection to the flexible pavement structure 100. The flexible pavement structure 100 incorporating the layered system 150 of the present disclosure further preserves balance between technological, environmental, and social costs related to its construction.

The flexible pavement structure 100 of the present disclosure with the aforementioned properties and characteristics may be suitable for use in road and highway construction projects, airport runways and aprons, as well as vehicle parking spaces. The present flexible pavement structure 100 may be preferred for road constructions and the like because of its long lifespan, ability to withstand heavy and more frequent loads (like traffic flows), short curation time which means short traffic and business disruptions, relatively easy repairability as it can be opened and patched; and are particularly suited for regions experiencing low temperatures as the flexible pavement structure 100 may help to prevent damage due to frost heaving by limiting its penetration.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A frost heave resistant pavement structure having polyethylene layers, comprising:
   a surface layer, which comprises an asphaltic concrete;
   a base layer selected from the group consisting of crushed stone, crushed gravel, uncrushed gravel, rock, slag, and sand, wherein the surface layer is adjacent to and above the base layer;
   a sub-base layer selected from the group consisting of crushed aggregate, a mixture of fine and coarse aggregate, and engineered fill; and
   a subgrade layer selected from the group consisting of soil and rock, wherein the sub-base layer is adjacent to and above the subgrade layer; wherein:
   a layered system, composed of first, second, and third materials which are different from each other, is disposed as an interface layer between the base layer and the sub-base layer, wherein the first material is disposed as a top-most layer above the second and third materials, the third material is disposed as a bottom-most layer under the first and second materials, and the second material is disposed as a layer between the first and third materials; and
   the first material is a geotextile fabric made of polyethylene, wherein the first material is present as a ground stabilizing or reinforcing layer in the layered system; and
   the second material is a waterproof heat insulation cross-linked polyethylene (XPE) foam, wherein the second material is present as a water proof or water impermeable layer in the layered system; and
   the third material is a glass foamed insulation material.

2. The frost heave resistant pavement structure of claim 1, wherein the first material has a tensile strength of from 10 kN/m to 20 kN/m.

3. The frost heave resistant pavement structure of claim 1, wherein the first material has a tensile elongation of from 50% to 65%.

4. The frost heave resistant pavement structure of claim 1, wherein the geotextile fabric has a California bearing ratio (CBR) puncture resistance of from 2700 N to 2800 N.

5. The frost heave resistant pavement structure of claim 1, wherein the geotextile fabric has a cone drop of from 20 mm to 30 mm.

6. The frost heave resistant pavement structure of claim 1, wherein the first material has a pore size of from 50 μm to 250 μm.

7. The frost heave resistant pavement structure of claim 1, wherein the geotextile fabric has a permeability of from 50 l/m²s to 65 l/m²s.

8. The frost heave resistant pavement structure of claim 1, wherein the first material is adjacent to and above the second material and the second material has a thermal conductivity of from 0.01 W/mK to 0.1 W/mK.

9. The frost heave resistant pavement structure of claim 1, wherein the second material has a temperature resistance of from −40° C. to 100° C.

10. The frost heave resistant pavement structure of claim 1, wherein the second material has a water vapor transmission rate of less than 1 g/m²/day.

11. The frost heave resistant pavement structure of claim 1, wherein the second material is present in an amount of from 180 g/m² to 410 g/m².

12. The frost heave resistant pavement structure of claim 1, wherein the second material has a density of from 400 g/m² to 450 g/m².

13. The frost heave resistant pavement structure of claim 1, wherein the second material is adjacent to and above the third material.

14. The frost heave resistant pavement structure of claim 1, wherein the third material has a thermal conductivity of from 0.01 W/mK to 0.1 W/mK.

15. The frost heave resistant pavement structure of claim 1, wherein the third material has a compressive strength of from 300 kPa to 500 kPa.

* * * * *